United States Patent [19]

Klomp

[11] Patent Number: 4,606,234

[45] Date of Patent: Aug. 19, 1986

[54] RATIO CONTROL MECHANISM FOR A FRICTION DRIVE TRANSMISSION

[75] Inventor: Edward D. Klomp, Mt. Clemens, Mich.

[73] Assignee: General Motors Corporation, Detroit, Mich.

[21] Appl. No.: 749,516

[22] Filed: Jun. 27, 1985

[51] Int. Cl.⁴ .................. F16H 15/00; F16H 15/16; F16H 15/42

[52] U.S. Cl. ........................ 74/192; 74/190; 74/191; 74/193

[58] Field of Search .............. 74/190, 190.5, 191, 74/192, 193, 194, 197, 200, 201, 110; 414/917

[56] References Cited

U.S. PATENT DOCUMENTS

| | | | |
|---|---|---|---|
| 760,460 | 5/1904 | Leighton | 74/192 |
| 1,332,227 | 3/1920 | Norman | 414/917 |
| 1,362,655 | 12/1920 | West | 74/192 |
| 1,443,991 | 2/1923 | Hayden | 74/191 |
| 1,637,664 | 8/1927 | Stoeckicht | 74/192 |
| 2,205,031 | 6/1940 | Bugden | 74/192 |
| 2,590,755 | 3/1952 | Cloud | 74/198 |
| 2,611,038 | 9/1952 | Graham | 74/193 |
| 2,889,713 | 6/1959 | Parish et al. | 74/190 |
| 4,400,985 | 8/1983 | Bond | 74/110 |

OTHER PUBLICATIONS

*IBM Technical Disclosure Bulletin*, "Positioning Device", Haug and Ward, vol. I, No. 1, Jun. 1958.
*IBM Technical Disclosure Bulletin*, "Motion Multiplier", Mastmann and Scacciaferro, vol. 23, No. 3, Aug. 1980.

*Primary Examiner*—Kenneth J. Dorner
*Assistant Examiner*—Michael D. Bednarek
*Attorney, Agent, or Firm*—Donald F. Scherer

[57] ABSTRACT

A ratio control mechanism for a variable ratio friction drive transmission has an adjustable torus member. The friction drive transmission includes input and output friction members which are frictionally drive connected by the torus member. The central or major axis of the torus member is controlled angularly relative to the input and output friction members by a four-bar linkage. Angular adjustment of the torus member causes a speed ratio change between the input and output members.

4 Claims, 2 Drawing Figures

RATIO CONTROL MECHANISM FOR A FRICTION DRIVE TRANSMISSION

BACKGROUND OF THE INVENTION

This invention relates to power transmission control mechanisms and more particularly to control mechanisms for friction drive transmissions.

Prior art transmission control mechanisms for friction drive transmissions have used a friction ring as a driving connection between the input and output members. Many of these controls provide for moving the friction ring laterally along the friction surfaces to change the speed ratio between the input and output members. Such controls require substantial control forces to move the friction ring during the ratio change. At least one prior art mechanism, which uses a friction ring as a ratio control member, provides a contoured cross section for the ring which when tilted relative to the friction driving members, eliminates the drive connection therebetween such that lateral movement can be accomplished with a low force input. However, during a ratio change with such a device, the driving connection between the input and output members is disconnected.

SUMMARY OF THE INVENTION

The present invention uses a toroidal friction ring disposed between the input and output friction drive members of the transmission. To change or adjust the drive ratio between the input and output members, the major axis of the control ring is adjusted relative to the input and output friction drive members. During this adjustment, the control ring remains in engagement and continues to provide for the transmission of drive forces throughout the ratio change in operation. The control ring being circular in cross section rolls, in a dircetion 90° to the drive transmitting direction, on the drive surfaces of the input and output friction members during a ratio change. The rolling action causes the control ring to progress along the drive surfaces during the ratio change such that drive engagement between the input and members is continually maintained. The forces required to angularly displace the center of the control ring are very small. Thus, the ratio change is accomplished with small or minimal control forces.

It is an object of this invention to provide an improved control for a friction drive transmission wherein a control ring is controlled in its angular attitude to the input and output friction members of the transmission and wherein changing of the angular attitude results in a speed ratio change between the input and output friction members of the transmission without releasing the drive engagement.

It is another object of this invention to provide an improved ratio control for a friction transmission having a toroidal friction ring frictionally driving between the input and output friction members of the transmission wherein the toroidal ring is a member of a four-bar linkage having one bar member operable for linear movement resulting in angular displacement of the central axis of the toroidal ring relative to the input and output members such that rolling action of the body of the torus between the input and output friction members occurs while the center of the torus body between the input and output members move linearly in unison with the one bar member to effect a speed ratio change between the input and output friction members of the transmission.

These and other objects and advantages of the present invention will be more apparent from the following specification and drawings.

DESCRIPTION OF THE EMBODIMENT

Figure 1:
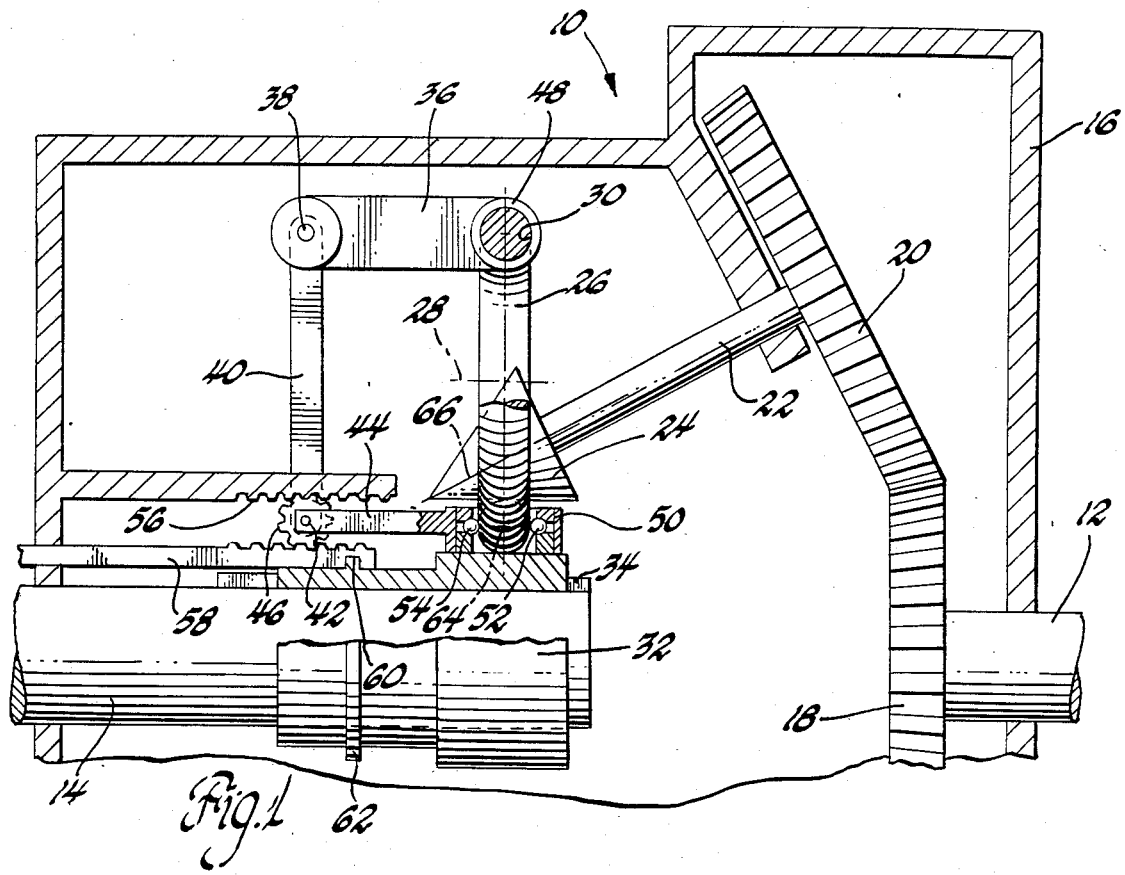
FIG. 1 is a diagrammatic representation of one embodiment of the invention operating at one ratio.

Referring to the drawings, wherein like characters represent the same or corresponding parts throughout the several views, there is seen a friction transmission, generally designated 10, and incorporating a pair of shafts 12 and 14 which are rotatably disposed in a housing 16. Either of the shafts 12 or 14 can be the input shaft while the other shaft is the output shaft. For purposes of this discussion, shaft 12 will be considered the input shaft and shaft 14 will be considered the output shaft.

The shaft 12 has secured thereto a gear member 18 which meshes with a gear member 20 secured to a shaft 22 which is rotatably mounted in the housing 16. The shaft 22 has secured for rotation therewith a friction member 24 which is conical in shape. The conical member 24 will, for purposes of the following discussion be considered the friction input member.

Frictionally engaging or otherwise frictionally driven by the conical member 24 is a ring or torus member 26. The torus member 26 has a central or major axis 28 about which the torus 26 rotates. The torus 26, as seen at 30, is circular in cross section. The body of torus 26 also frictionally engages a drive collar 32 which is drivingly connected through a spline 34 to the shaft 14. The drive collar 32, for purposes of this discussion, will be considered the friction output member of the transmission 10. The rotation of input shaft 12 is transmitted by the gears 18 and 20 and shaft 22 to the friction cone 24. The friction cone 24 drives the torus 26 so that it revolves about its central axis 28 and frictionally drives the drive collar 32. Rotation of the drive collar 32 is transmitted to the output shaft 14 through the spline 34.

Torus 26 is one member of a four-bar linkage which also includes a link 36 which is pivotally connected at 38 to a link 40 which is pivotally connected at 42 to a link 44. The link 40 has secured thereto a pinion gear 46 which is adapted to rotate about its center located at the pivot 42. The link 36 incorporates a bearing 48 which rotationally supports the upper portion of torus 26. The link 44 includes a yoke or collar portion 50 which incorporates a pair of bearing members 52 and 54 which support the lower end of torus 26.

The pinion 46 meshes with a stationary rack 56 formed in or otherwise integrally secured with the housing 16 and with a movable rack 58. The movable rack 58 has a slot or groove 60 which slidingly engages a cylindrical extension 62 formed on the friction collar 32.

Linear movement of the rack 58 will result in linear movement of the collar 32 and rotation of the pinion gear 46. Rotation of the pinion gear 46 will result in tilting or rotation of the link 40 about pivot 42. Since the link 44 and the link 36 must remain parallel as must the link 40 and torus 26, the torus 26 will tilt or pivot about an axis 64 which extends through the cross-sectional center of the body of torus 26 at a position disposed between the friction input member 24 and the friction output member 32.

Since the rack 56 is stationary and the rack 58 is moving linearly, the center 42 of pinion 46 will move linearly one-half the distance of the linear movement of rack 58. The pinion 46 therefore rolls along the stationary rack 56.

Figure 2:
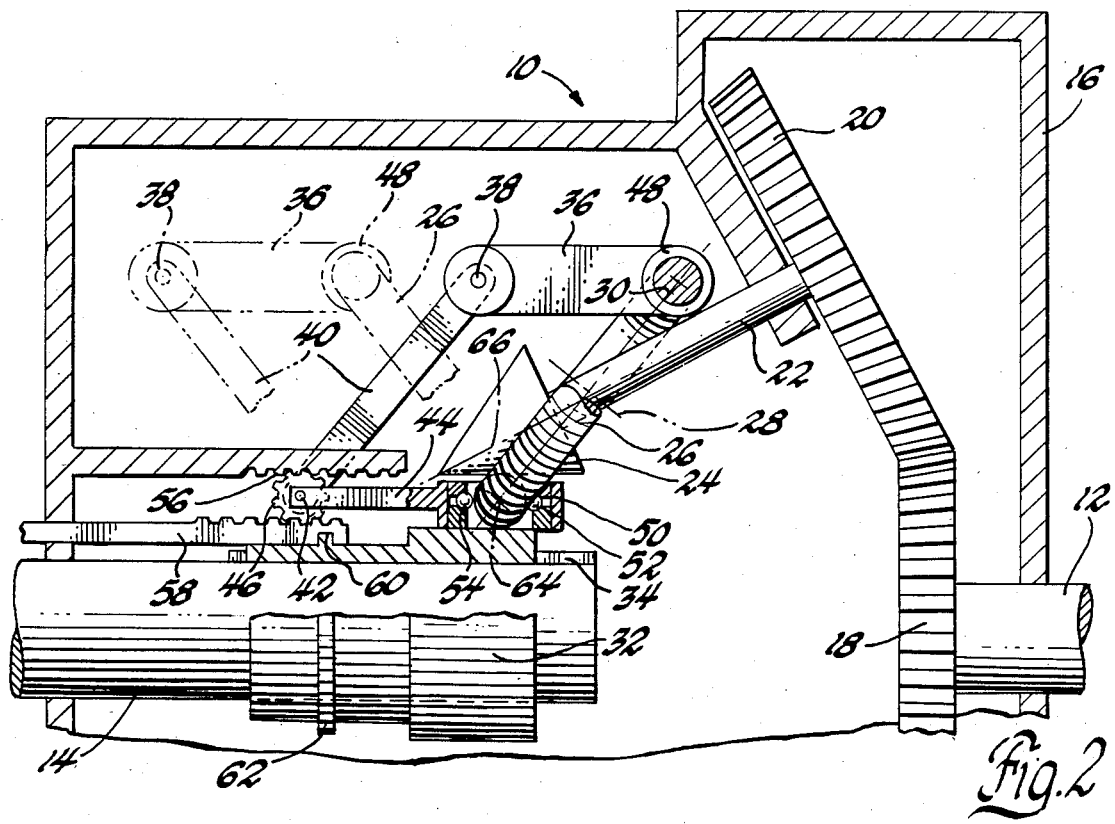
FIG. 2 is a diagrammatic view showing the apparatus of FIG. 1 operating at another ratio.

The collar 32 moves linearly with the rack 58 and the link 44 moves linearly with the center 42 of pinion 46. The torus 26 rotates about the axis 64 such that the central 28 is tilted or pivoted relative to the surfaces of the input and output friction members 24 and 32, as seen in FIG. 2. As the torus 26 tilts, the torus body rotates such that a rolling action occurs between the surface of cone 24 and the body of torus 26 and between the collar 32 and the body of torus 26. The action between the body of torus 26 and the friction members 32 and 24 is identical with the action between the pinion gear 46 and the racks 56 and 58. One of these rolling actions is enforced by toothed members while the other is enforced by frictional engagement. The four-bar linkage of which the torus 26 is a component assists in ensuring that this simultaneous rolling action will occur.

When the rack 58 is moved leftward, the four-bar linkage will cause tilting of the torus 26 toward the position shown in the solid lines in FIG. 2. Rightward movement of the rack 58 will cause tilting of the torus 26 toward the position shown in phantom line in FIG. 2. The drive ratio between the cone 24 and the collar 32 is determined by the cone radius measured from the point of contact with the torus body 26 to a point perpendicular to the centerline 66 of the cone 24 and the radius of the drive collar 32.

When the torus 26 is tilted to the solid line position shown in FIG. 2, the effective radius on the cone 24 is reduced, thereby increasing the torque ratio while reducing the speed ratio. When the torus 26 is tilted to the phantom line position shown in FIG. 2, the effective operating radius of cone 24 is increased thereby reducing the torque ratio while increasing the speed ratio.

From the above description, it should be appreciated that the torus 26 undergoes a rolling action between the friction drive members while a ratio change is occuring. The rolling action eliminates the need for large control forces which would be necessary if sliding movement should occur between the components of the friction drive. It will also be noted that the drive forces are continuously transmitted between the cone 24 and the collar 32 while the torus 26 is being manipulated for a ratio change.

The control mechanism incorporated in the four-bar linkage could also extend downward from its pivot 42 and axis 64 such that the link 36 would extend below the shaft 14. It is also possible to provide two or more control linkages angularly disposed about the shaft 14. If an increased number of control linkages is desired, an increased number of conical drives would also be necessary. While the member 24 is shown as a cone, it is possible to use a flat disc member in which the drive shaft would extend 90° to the axis of shaft 14. In such an arrangement, it would be necessary to have the linkage extend opposite to the drive shaft of the disc member.

The diameter of the body of torus 26 can be increased or decreased to provided for a change in the ratio range through which the control mechanism is operable. If the diameter of torus 26 is increased, the ratio range over which the control will operate will likewise increase.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A ratio control for a toroidal drive mechanism having torus means adjustably disposed in friction drive relation between an input drive member and an output drive member for transmitting drive forces at a plurality of ratios therebetween, said control comprising; a linearly movable control rack; a gear member meshing with said control rack; a stationary reaction rack meshing with said gear member; a four-bar linkage means including said torus means and having one bar member secured to said gear member for rotation about the center thereof in response to linear movement of said control rack, and a second bar member connected between the center of said gear member and said torus means and being movable linearly with the center of said gear member in response to linear movement of said control rack, said torus means moving linearly between said input and output drive members and simultaneously rotating between said input and output drive members in response to the linear movement of said second bar member and the rotational movement of said first bar member to thereby change the drive ratio between said input and output drive members.

2. A ratio control for a toroidal drive mechanism having torus means with a circular cross section adjustably disposed in friction drive relation between an input drive member and an output drive member for transmitting drive forces at a plurality of ratios therebetween, said control comprising; a linearly movable control rack; a gear member meshing with said control rack; a stationary reaction rack meshing with said gear member; a four-bar linkage means including said torus means and having one bar member secured to said gear member for rotation about the center thereof in response to linear movement of said control rack, and a second bar member connected between the center of said gear member and said torus means and being movable linearly with the center of said gear member in response to linear movement of said control rack, said torus means moving linearly between said input and output drive members and simultaneously rotating about its cross section between said input and output drive members in response to the linear movement of said second bar member and the rotational movement of said first bar member to thereby change the drive ratio between said input and output drive members.

3. A ratio control for a toroidal drive mechanism having torus means adjustably disposed in friction drive relation between an input drive member and an output drive member for transmitting drive forces at a plurality of ratios therebetween, said control comprising; a linearly movable control rack; a gear member meshing with said control rack; a stationary reaction rack meshing with said gear member; a four-bar linkage means including said torus means and having one bar member secured to said gear member for rotation about the center thereof in response to linear movement of said control rack, and a second bar member pivotally connected to the center of said gear member and operatively connected said torus means between said input and output drive members, said second bar member and being movable linearly with the center of said gear member in response to linear movement of said control rack, said torus means moving linearly between said input and output drive members and simultaneously rotating between said input and output drive members in response to the linear movement of said second bar member and the rotational movement of said first bar member to thereby change the drive ratio between said input and output drive members.

4. A ratio control for a friction drive mechanism having torus ring means adjustably disposed in friction drive relation between an input drive member and an output drive member for transmitting drive forces at a plurality of ratios therebetween, said torus ring means having a rotational center about which the ring rotates when transmitting drive forces and a cross-sectional center, said control comprising; a linearly movable control rack; a gear member meshing with said control rack; a stationary reaction rack meshing with said gear member; a four-bar linkage means including said torus ring means and having one bar member secured to said gear member for rotation about the center thereof in response to linear movement of said control rack, and a second bar member connected between the center of said gear member and said torus ring means and being movable linearly with the center of said gear member in response to linear movement of said control rack, said torus means cross-sectional center moving linearly between said input and output drive members and simultaneously rotating between said input and output drive members in response to the linear movement of said second bar member and the rotational movement of said first bar member to thereby change the drive ratio between said input and output drive members.

* * * * *